(No Model.) 2 Sheets—Sheet 2.

A. A. GOUBERT.
FEED WATER HEATER.

No. 367,516. Patented Aug. 2, 1887.

WITNESSES:
H. F. Parker.
J. Jos. DeRycke

INVENTOR
Aug. A. Goubert

UNITED STATES PATENT OFFICE.

AUGUSTE A. GOUBERT, OF BROOKLYN, NEW YORK.

FEED-WATER HEATER.

SPECIFICATION forming part of Letters Patent No. 367,516, dated August 2, 1887.

Application filed March 30, 1887. Serial No. 233,069. (No model.)

*To all whom it may concern:*

Be it known that I, AUGUSTE A. GOUBERT, a citizen of the United States, residing at Brooklyn, in the county of Kings and State of New York, have invented a new and useful Improvement in Feed-Water Heaters and Purifiers, of which the following is a specification.

My invention relates to that class of feedwater heaters and purifiers in which the water therein contained is never brought into direct contact with the steam, but is heated by the heat being transmitted from the steam to the water through metallic surfaces. The better types of such heaters are usually made of a number of tubes placed longitudinally in a cylindrical shell, the water being inside the tubes and the steam outside, or vice versa.

Some parts of my invention are equally applicable to both kinds, as also to surface-condensers; but in the apparatus I am about to describe I prefer to have the water inside the tubes, these being surrounded by the steam in the shell. While the shell and other parts, for the sake of cheapness, have to be made of iron, experience has shown that when the tubes are also made of the same material they, being of wrought metal, and necessarily thin in order to readily transmit the heat, are soon attacked by the fatty acids due to the decomposition of the cylinder oil or grease, and often by the salts contained in the water. They become pitted, corroded, and quickly destroyed. They are therefore made of copper or brass, which resists better the action of these various agents; but, as the ratio of expansion of these metals within the same ranges of temperature is greater than that of iron, it has been found necessary to provide means whereby the tubes may be allowed to expand and contract independently of the shell. A part of my invention consists in improved means to effect this purpose.

Another part of my invention is an improved method of introducing and forcing the water through the apparatus, whereby the settling of sediment is facilitated.

A further improvement consists in providing deflectors at the inlet and outlet of the water for the purpose of deviating the current, thereby facilitating the settling of sediment and separation of scum, and also equalizing the flow.

Figure 1:
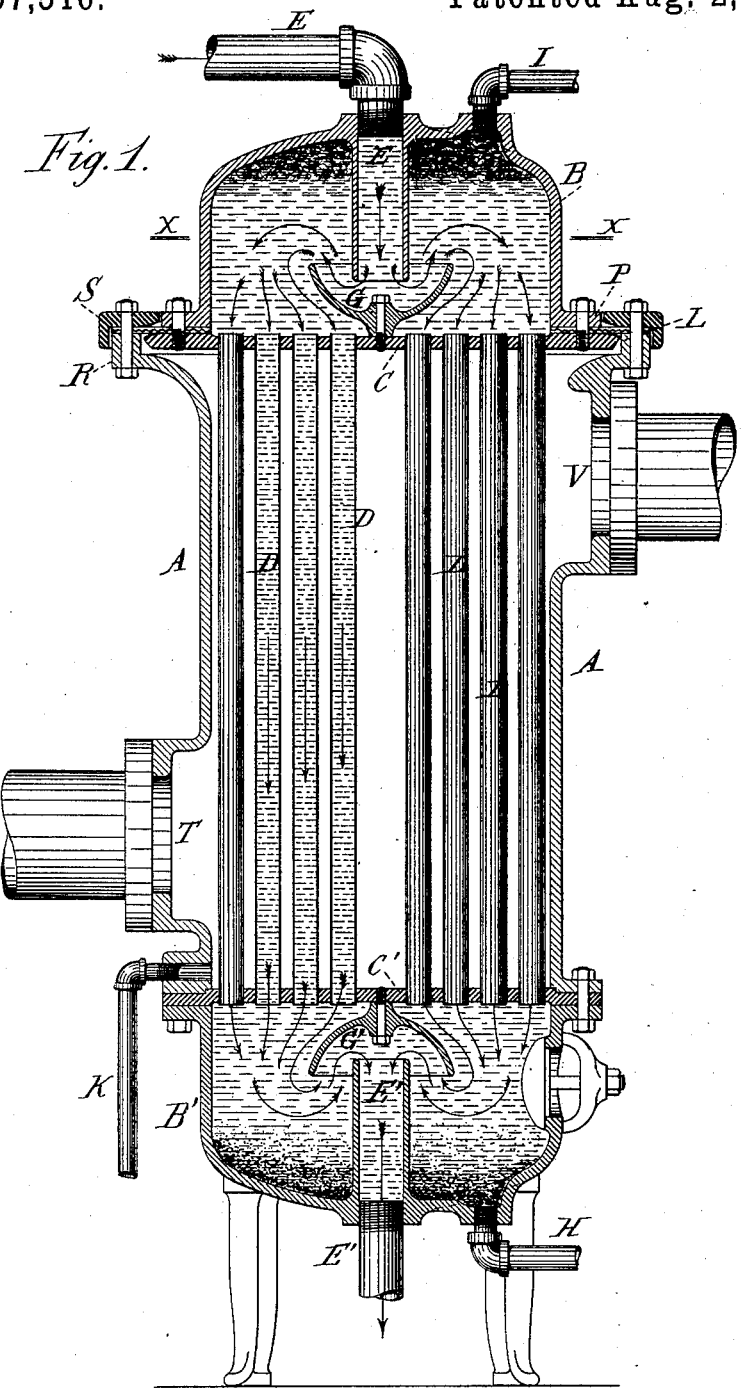
Figure 2:
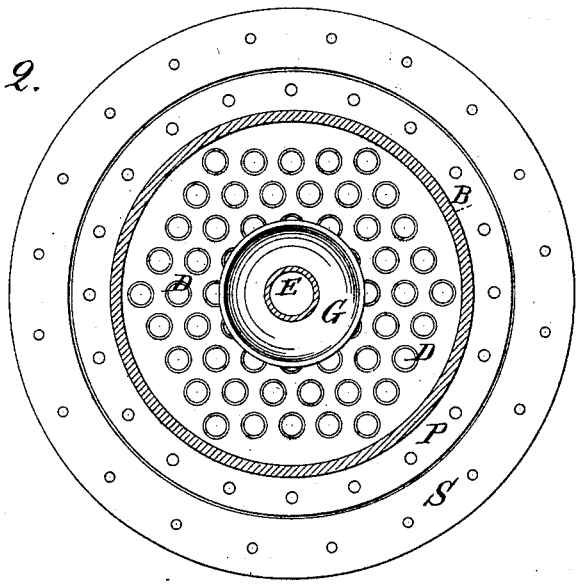
Figure 3:
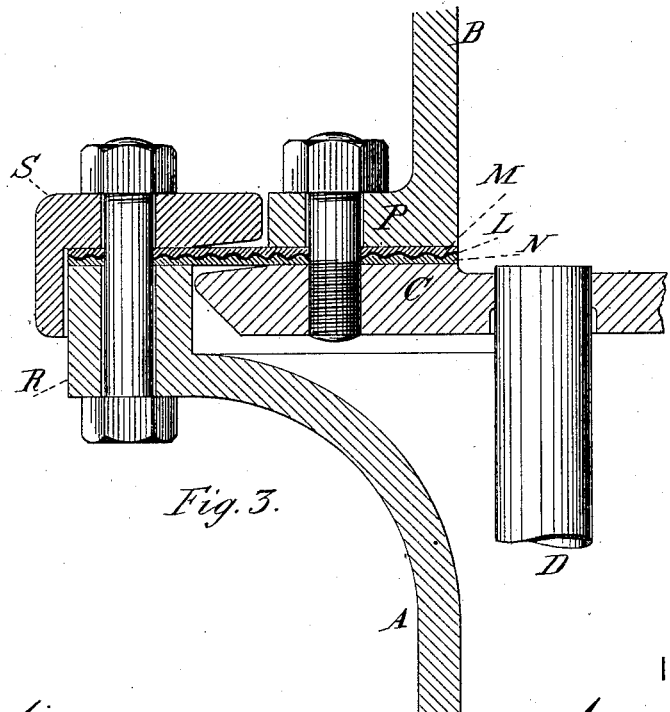

In the drawings, Figure 1 is a vertical section through the apparatus. Fig. 2 is a horizontal section through the upper water-chamber at X X, and Fig. 3 is an enlarged section of a portion of the expansion-joint.

A is the shell, preferably made of cast-iron, as it withstands better the action of the fatty acids. This shell A is provided with nozzles T and V for the admission and exit of the steam, and also with a pipe, K, for the removal of the water of condensation.

B is the upper water-chamber, provided with an inwardly-projecting pipe, E, for the admission of the cold water.

B' is the lower water-chamber, which is also provided with an inwardly-projecting pipe, E', for the outlet of the heated water.

C is the upper tube-plate, made to fit loosely into the upper part of the shell A. This said tube-plate C is firmly bolted to the flange P of the chamber B.

C' is the lower tube-plate, and is securely bolted between the lower flange of the shell A and the flange of the chamber B'.

D D D are the tubes, preferably made of brass. These tubes are firmly secured at the ends to the tube-plates C and C'.

G G' are dish-shaped deflectors secured to the tube-plates C and C', and placed directly opposite the ends of the pipes E E'.

H is a pipe for the removal of mud and sediment from the chamber B', and I is a similar pipe for the removal of scum from the chamber B.

L is a flat ring or gasket of flexible material, preferably made of thin copper, which I also prefer to make with circular corrugations in order that it be more elastic. This corrugated gasket should be of sufficient width to extend across the face of the flange P, and also across that of the upper flange, R, of the shell A.

M N are annular gaskets of soft material, preferably vulcanized rubber, which are shown as covering the entire surface of the metallic gasket L.

S is a heavy iron ring, the internal diameter of which is slightly larger than the external diameter of the flange P.

The metallic gasket L being placed between the two rubber gaskets M N, the three are set upon the top of the flange R, with their inner portion extending over the tube-plate C. The ring S is placed over them, and they are firmly bolted between S and R. The water-chamber B is then placed upon the gaskets and firmly bolted through them to the tube-plate C. A flexible connection is thus made between the shell A and the tube-plate C.

Supposing the maximum length of the tubes and shell to be ten feet, the utmost difference of expansion within the ranges of temperature using exhaust-steam would be about one-sixteenth of an inch. If the apparatus be made so that, when cold, the upper face of the tube-plate C be one thirty-second of an inch below the upper face of the flange R, the maximum that the flexible metallic gasket will have to spring will be one thirty-second of an inch above and below the horizontal position. When it becomes necessary to clean the interior of the tubes, the upper water-chamber, B, is removed, and a scraper, brush, or swab may then be used, the mud or sediment falling into the lower chamber, B', to be blown off through the pipe H.

While a tight joint such as that required between the flange P and the tube-plate C is often made by bolting together the two flanges with a metallic gasket, corrugated or plain, between them, the soft metal by the pressure being made to flow into the pores of the casting, and producing a tight and effective joint, it is generally found that if such a joint be broken the flanges cannot be replaced in exactly the same position, and the pressure applied by screwing down the bolts is insufficient to make the joint tight again. To provide for this, I use the rubber gaskets M and N to protect the metallic gasket L, so that the chamber B may be removed and replaced at will, always making a tight joint without the necessity of straining the bolts and without injury to the metallic gasket L.

The operation of my apparatus is as follows: The steam, being admitted into the shell at T, spreads among the tubes D D, impinging upon their outer surfaces, and finally passes out at V. In the normal condition the water-chambers B B' and the tubes D D are kept filled with water, which can only pass out when forced through the heater into the boiler against steam-pressure. The cold water introduced through the pipe E, by means of a pump or other forcing apparatus, is deflected in an upward direction by the deflector G, when the floating particles of vegetable matter are enabled to rise to the surface, from whence they may be periodically blown off through the pipe I. It is a well-known principle in hydraulics that if a vessel be completely filled with a fluid the pressure exerted at one point is equally distributed in all directions and becomes the same throughout the mass. Therefore a uniform pressure is exerted in the chamber B, and the incoming water as fast as supplied is distributed evenly to all the tubes and moves downward, forcing the heated water before it, and becoming heated in its turn until it arrives into the lower water-chamber, B', from whence it passes out through the pipe E' to the boiler. As the water becomes heated, many of the salts in solution—such as carbonates of lime and magnesia—are precipitated, and these, with the particles of mud and sand mechanically carried by the water, must be allowed to separate and settle before the water goes to the boiler, thus avoiding the formation of an injurious scale. This has been many times attempted with varying success. Although these particles are very minute, if the water be allowed to stand still for a sufficient length of time they will settle by virtue of their own gravity; but if an ascending current is produced in the water the friction of the current against these fine particles of sediment carries them upward and out of the vessel without allowing them to settle, and even a very feeble current will produce this effect. I, on the contrary, introduce the water from above and produce a steady uniform downward current. If the force of gravity has a tendency to carry the particles to the bottom, this tendency is increased by the downward current, which is forcing them down instead of retarding their fall. They therefore have attained, upon arriving in the lower water-chamber, B', a comparatively considerable velocity, and upon the current being deviated and turning suddenly around the edge of the deflector G' the said particles are projected downward beyond the path of the current into the still space below, where they settle, to be removed at intervals through the mud blow-off pipe H.

I claim as my invention—

1. In a feed-water heater and purifier substantially such as herein described, an upper water-chamber provided with an inlet for the introduction of the cold water and an outlet for the removal of scum, and a lower water-chamber provided with outlets for the removal of the heated water and sediment, in combination with a set of vertical heating-tubes forming a communication between the said water-chambers, the said tubes being surrounded by the steam, substantially as and for the purposes herein specified.

2. In a feed-water heater or condenser, substantially as herein described, the combination of the shell A, the tubes D D, the water-chambers B B', and the inwardly-projecting pipes E E', with the dish-shaped deflectors G G', as and for the purposes herein specified.

3. In a feed-water heater or condenser, substantially as herein described, the combination of the tubes D D, the tube-plate C, the chamber B, and the shell A, with a gasket of flexible material firmly bolted between the chamber B and the tube-plate C, and extending across over the end of the shell A and firmly secured thereto, thus effecting the triple purpose of making a water-tight joint between the chamber B and the tube-plate C, sealing the end of the shell A, and making a flexible connection between the tube-plate and the shell, thus allowing the tubes to freely expand and contract independently of the said shell, substantially as and for the purposes herein specified.

4. In a feed-water heater or condenser, substantially as herein described, the chamber B, the tube-plate C, the shell A, and the metallic gasket L, forming a flexible connection between the tube-plate C and the shell A, in combination with the gaskets M N, made of vulcanized rubber or its equivalent, as and for the purposes herein specified.

In testimony that I claim the foregoing as my invention I have signed my name, in presence of two witnesses, this 25th day of March, 1887.

AUG. A. GOUBERT.

Witnesses:
   H. F. PARKER,
   J. JOS. DERYCKE.